P. L. FERGUSON.
CONDIMENT HOLDER.
APPLICATION FILED APR. 3, 1914.

1,165,238. Patented Dec. 21, 1915.

Witnesses
E. P. Ruppert

Inventor
P. L. Ferguson
By Victor J. Evans
Attorney

UNITED STATES PATENT OFFICE.

PETER L. FERGUSON, OF OGDEN, UTAH.

CONDIMENT-HOLDER.

1,165,238.  Specification of Letters Patent.  Patented Dec. 21, 1915.

Application filed April 3, 1914. Serial No. 829,315.

*To all whom it may concern:*

Be it known that I, PETER L. FERGUSON, a citizen of the United States, residing at Ogden, in the county of Weber and State of Utah, have invented new and useful Improvements in Condiment-Holders, of which the following is a specification.

An object of the invention is to provide a condiment holder for containing salt and pepper or other similar condiments and wherein one of the condiments can be sifted or otherwise removed from the holder independently of the other condiment.

The invention comprehends, among other features, the provision of a receptacle preferably having a sifter top, with a suitable partition member forming a compartment within the receptacle and common to the same sifter top, with means whereby the condiment in the receptacle can be sifted through the top when the condiment contained in the receptacle formed by the partition in the member is prevented from being sifted through the top, and vice versa.

Figure 1:
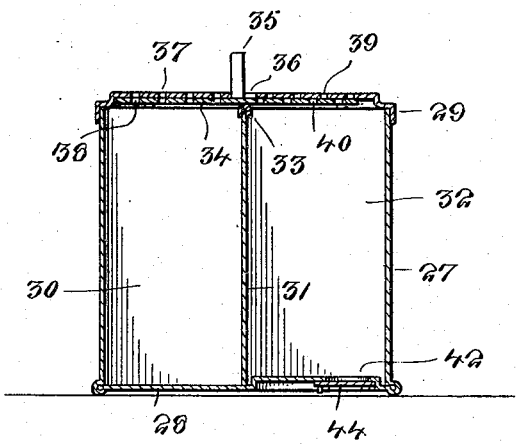
Figure 2:
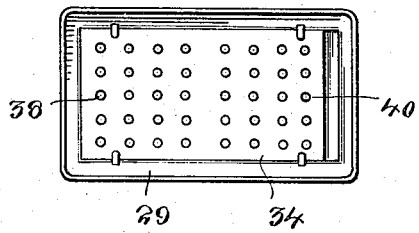
Figure 3:
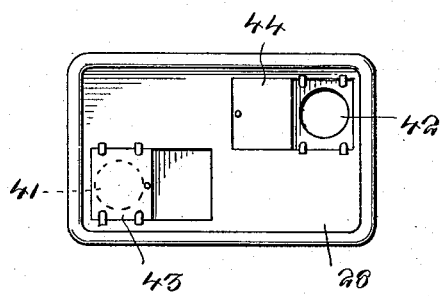

In the further disclosure of the invention reference is to be had to the accompanying drawings, constituting a part of this specification, in which similar characters of reference denote corresponding parts in all the views, and in which:

Figure 1 is a vertical sectional view of a modified form of structure in which the casing forming the receptacle is of a rectangular nature; Fig. 2 is a bottom plan view of the sifter top shown in Fig. 1; and Fig. 3 is a bottom plan view of the structure shown in Fig. 1, showing the manner of filling the same.

Referring more particularly to the drawing the casing is indicated by the numeral 27 and is preferably of a rectangular construction, said casing having a bottom 28 which is preferably rigid therewith and a sifter top 29 which can be removed from the casing. The casing 27 forms a compartment 30 and secured within the casing is a partitioning member 31 forming a compartment 32. The partitioning member 31 also carries a soft and pliable member 33 formed of rubber or the like, at its upper end, and which member is adapted to abut against the medial portion of a plate 34 movably supported on the under side of the sifter top 29, said plate having an operating member 35 projecting through a slot 36 formed in the sifter top 29. The sifter top 29 has a set of perforations 37 which are adapted to register with a set of perforations 38 formed in the plate 34 when the plate is in one position relatively to the sifter top and the sifter top is also provided with a set of perforations 39 adapted to register with perforations 40 formed in the plate 34 when the plate is in another position relatively to the sifter top so that when the perforations 37 and 38 register, the condiment contained in the compartment 30 can be sifted therefrom, whereas when the perforations 39 and 40 register, the condiment contained in the compartment 32 may be sifted therefrom.

As mentioned heretofore, the bottom 28 is preferably secured rigidly to the casing 10 and the said bottom is provided with an instruck portion as shown, having an opening 41 communicating with the compartment 30, and an instruck portion having a second opening 42 communicating with the compartment 32. Mounted to slide on the under side of the bottom is a closure 43 adapted to close the opening 41, and a similar closure 44 is mounted to slide on the under side of the bottom for normally closing the opening 42, the said closures being adapted to be independently operated. When it is desired to fill the condiment holder described with salt and pepper or similar condiments, the closure 43 is slid into open position to uncover the opening 41 and upon inverting the condiment holder the compartment 30 can be readily filled with salt and the closure returned to position to close the opening 41, after which the closure 44 is slid into open position to uncover the opening 42, and, by means of which, upon inverting the condiment holder, the compartment 32 can be filled with pepper, after which the closure 44 is again moved into closed position.

It will be readily apparent that the members 26 and 33 of the respective structures set forth will prevent the condiment in one compartment from mixing with the condiment in the other compartment at the upper ends of the compartments, while at the same time the said members being of a resilient nature, will not prevent the proper operation of the respective plates 19 and 34.

The structures described are of a simple construction, can be cheaply manufactured and can be kept in a clean and sanitary condition, while at the same time they will permit of carrying two condiments in one article and independently sifting the condiments therefrom, the said condiments being also protected against dust and dirt and from contamination with germs.

Having thus described my invention, I claim:

A condiment holder comprising a casing, a bottom for the casing, said bottom having an inwardly struck portion lying above the plane of the bottom proper, with said inwardly struck portion having an opening therein, and a sliding closure for said opening, and disposed to operate in a horizontal plane between the horizontal planes of the inwardly struck portion and the bottom proper.

In testimony whereof I affix my signature in presence of two witnesses.

PETER L. FERGUSON.

Witnesses:
D. R. WHEELWRIGHT,
B. F. THOMAS.